United States Patent [19]

Mertens et al.

[11] Patent Number: 5,578,188

[45] Date of Patent: *Nov. 26, 1996

[54] PROCESS OF DEPOSITING BY ELECTROPOLYMERIZATION A FILM OF A COMPOSITE MATERIAL ONTO AN ELECTRICALLY CONDUCTIVE SURFACE

[75] Inventors: Marc Mertens, Spa; Lucien Martinot, Olne; Cedéric Calberg, Liege; Robert Jerome, Tilff; Jean Schrijnemackers, Embourg, all of Belgium

[73] Assignee: "Recherche et Developpment du Groupe Cockerill Sambre" en abrège "RD-CS", Ougrée, Belgium

[*] Notice: The term of this patent shall not extend beyond the expiration date of Pat. No. 5,567,297.

[21] Appl. No.: 221,378

[22] Filed: Mar. 31, 1994

[30] Foreign Application Priority Data

Apr. 1, 1993 [BE] Belgium .................. 09300322

[51] Int. Cl.$^6$ ............... C25B 3/00; C25D 11/00
[52] U.S. Cl. .................. 205/334; 205/414; 205/422; 205/317
[58] Field of Search ................ 204/59 R, 72, 204/73 R; 205/317

[56] References Cited

U.S. PATENT DOCUMENTS

| | | | |
|---|---|---|---|
| 3,375,237 | 3/1968 | Baizer | 204/72 |
| 3,759,797 | 9/1973 | Masunaga et al. | 204/59 R |
| 4,474,688 | 10/1984 | Castle et al. | 204/59 R |
| 4,528,118 | 7/1985 | Murase et al. | 252/500 |
| 4,566,955 | 1/1986 | Naumann | 204/59 R |
| 4,911,801 | 3/1990 | Pons | 204/59 R |
| 4,933,106 | 6/1990 | Sakai et al. | 204/59 R |
| 5,100,523 | 3/1992 | Helms et al. | 204/59 R |

FOREIGN PATENT DOCUMENTS

| | | |
|---|---|---|
| 38244 | 4/1981 | European Pat. Off. . |
| 0038244 | 10/1981 | European Pat. Off. . |
| 0323351 | 7/1989 | European Pat. Off. . |
| 0450581 | 10/1991 | European Pat. Off. . |
| 2151242 | 7/1985 | United Kingdom . |

*Primary Examiner*—Kathryn Gorgos
*Assistant Examiner*—Edna Wang
*Attorney, Agent, or Firm*—Browdy and Neimark

[57] ABSTRACT

A film of a composite material is deposited by electropolymerization onto an electrically conductive surface. A mixture comprising a monomer, a substance forming a dopant, a supporting electrolyte and a solvent is subjected to electrolysis in which the conductive surface to be coated is used as either cathode or anode. The cathode or anode is polarized to a potential between the electron transfer between the electrically conductive surface and the monomer. Prior to electrolysis, a solution is made from the mixture containing the substance forming a dopant either as anion, cation, molecule, and/or as undissociated complex.

24 Claims, 6 Drawing Sheets

PROCESS OF DEPOSITING BY ELECTROPOLYMERIZATION A FILM OF A COMPOSITE MATERIAL ONTO AN ELECTRICALLY CONDUCTIVE SURFACE

FIELD OF THE INVENTION

The present invention relates to a process of depositing by electropolymerization a film of a composite material onto an electrically conductive surface, according to which process a mixture comprising:

(a) a monomer suited for forming a polymer on said surface, (b) a substance forming a dopant suited for being incorporated into this polymer, (c) a supporting electrolyte, and (d) a solvent is subjected to an electrolysis wherein said conductive surface to be coated is used as cathode or as anode and wherein said cathode or anode is polarized to a potential situated in the range of electron transfer between the electrically conductive surface and the monomer but respectively less negative or less positive than the reaction of the solvent, insofar as this solvent is different from said monomer, or of the supporting electrolyte in case said surface is used as cathode or as anode.

BACKGROUND OF THE INVENTION

In certain of the hitherto known electropolymerization deposition processes for forming a film of a composite material onto an electrically conductive surface, the dopant is formed by an inert load which is mechanically suspended an the electrolysis bath. This dopant is thus enclosed in the developing matrix and is codeposited without having reacted electrochemically onto said electrically conductive surface. In this way it is possible to incorporate for example titanium oxide in polypyrrole films onto an electrically conductive surface.

In the broad field of conductive polymers, the term dopant is used frequently but does not necessarily imply that it is incorporated as a result of a redox phenomenon but it does refer to a counter-ion of the conductive polymer which is indispensable for the electroneutrality of the deposit in its conductive form.

In other known processes, the dopant is formed by an active substance, more particularly as to redox reactions, and is fixed in advance onto the monomer. In this way, the formed film comprises a chemically bound entity which modifies the properties thereof.

An example wherein this latter process is applied is the modification of monomers which are precursors of conductive polymers, such as pyrrole, thiophene, by reaction with diverse groups such as ferrocene, etheroxides, alkyls, having an activity in very different fields such as oxidoreduction, complexation, and conductivity.

These known processes involve different drawbacks.

Indeed, when use is made as dopant of an inert substance suspended in the electrolysis bath, problems may arise, especially for relatively thin films, as to the homogeneity of the film deposited onto the electrically conductive surface.

If use is made of a process wherein the dopant is formed by an active substance, the monomer has to be modified chemically. This is an operation which cannot be performed onto all of the monomers, which considerably limits application of this process.

SUMMARY OF THE INVENTION

One of the essential objectives of the present invention is to propose a new process for forming a composite material film onto an electrically conductive surface by electropolymerization, which obviates said drawbacks of the above-mentioned known processes.

According to the invention, the process further comprises hereto the step of making, prior to said electrolysis, and starting from said mixture comprising the monomer, the dopant, the supporting electrolyte and the solvent, a solution containing the dopant either in anionic, cationic, molecular form and/or in complex form not dissociated into ions and possibly organised around a cation. These molecules and complexes are more particularly organic molecules and complexes soluble in the used solvent.

More particularly, the process according to the invention, envisaging primarily the deposition of a composite film onto metals which are usually susceptible to anodic dissolution in organic medium, seems to be better adapted to the deposition of polymeric films under cathodic operation conditions. It is in this way that use is preferably made according to the invention of a monomeric precursor of a non-conductive polymer.

Advantageously, use is made of an aprotic solvent.

According to a particular embodiment of the invention, use is made of a monomer acting as solvent and suited for dissolving said supporting electrolyte.

Other details and particularities of the invention will become apparent from the description given hereinafter by way of non limitative examples of several concrete embodiments of the process according to the invention with reference to the annexed graphs.

BRIEF DESCRIPTION OF THE DRAWINGS

In the different figures, the same reference numerals relate to the same elements.

DETAILED DESCRIPTION OF THE INVENTION

In a general way, use is made in the electropolymerization deposition process according to the invention for producing a composite material film onto an electrically conductive surface of a mixture comprising: (a) a monomer suited for forming a polymer onto this surface, (b) a substance forming a dopant suited for being incorporated into this polymer, (c) a supporting electrolyte and (d) a solvent.

This mixture is subjected to electrolysis wherein the conductive surface to be coated is used as cathode or as anode. This cathode or anode is polarized to a potential situated in the range of electron transfer between the metallic surface and the monomer, but respectively less negative or less positive than the reaction of the solvent or the supporting electrolyte in case that surface is used as cathode or as anode.

The essential characteristic of this process is the formation of a solution starting from said mixture, prior to subjecting it to the electrolysis, which solution contains the dopant as an anion, cation, molecule or complex not dissociated into ions and possibly organized around a mineral cation. In the case of a molecule or a complex, these preferably consist of an organic compound.

The solvent may either be an aprotic compound or may be formed by the monomer itself, or may further be a combination of these two.

The utilized electrolyte must be soluble in the selected solvent and the concentration must be sufficient to obtain a sufficiently high conductivity in the electrolysis cell wherein said mixture is introduced to achieve the electropolymerization deposition. It was found that this conductivity may generally be equal to or higher than $10^{-4}\Omega^{-1}cm^{-}$. Good results were obtained with a concentration situated between $10^{-3}$ and 5M, while preference is given to a concentration comprised between $5\times10^{-2}$ and $5\times10^{-1}$M.

In general, the supporting electrolyte may be composed of a perchlorate, a tosylate, a tetrafluoroborate, a hexafluorophosphate, a quaternary ammonium halide of formula :

wherein $X^-$ represents $ClO_4^-$, $BF_4^-$, $PF_6^-$, $OTos^-$, $Cl^-$, $Br^-$, . . . and wherein the identical or different $R_1$, $R_2$, $R_3$ and $R_4$ radicals are hydrogens, $C_1$ to $C_6$ alkyl or aryl radicals.

As the monomer, its concentration in the electrolysis bath must be sufficient to obtain the required homogeneity, thickness and adhesion. This concentration is generally maintained between $10^{-2}$M and 10M. Preference is given to a monomeric concentration comprised between $5\times10^{-2}$M and 2M except in the case wherein the monomer itself forms the solvent. This monomer may for example be of the vinylic or cyclic type. More particularly, it may be an organic molecule comprising a terminal ethylene bond conjugated to an electronegative group capable to cause a reduction by direct electron transfer at the cathode. More specifically, the monomer may consist of acrylonitrile, acrolien, or possibly 2-vinylpyridine or 4-vinylpyridine acrylamide or N-vinylpyrrolidine.

The maximum dopant concentration is either determined by its solubility limit in the electrolysis bath or by its down-grading effect on the polymeric layer.

According to the invention, the electrolysis bath contains as from the beginning this dopant to be incorporated into the polymeric film to be deposited onto an electrically conductive surface in the form of totally dissociated ions or neutral molecules.

More particularly, the dopant concentration in the electrolysis bath is generally lower than the monomeric concentration and is situated in most of the cases between $10^{-7}$M and 5M. Preference is given to concentrations of between $10^{-6}$M and $10^{-1}$M.

As indicated already hereinabove, the dopant may be of very different natures. This dopant may consist for example of inorganic or organic compounds which may be in the form of complexes and/or which may have a radioactive activity. As inorganic compounds mention can be made of: $TiCl_4$, $CuBr_2$, $Fe(Ac)_2$, $NiBr_2(P\Phi_3)_2$, $AgNO_3$, $AlCl_3$, $FeCl_3$, $MoCl_3$, $MoCl_5$, $MnBr_2$, $CrCl_3$, $WCl_6$, $VCl_3$, $MgCl_2$, $PbCl_2$, $MoBr_3$, $MoBr_4$, $TiCl_3$.

As organic compounds, mention can be made of amides and quinones and as complex compounds ferrocene and carbonyl metals.

Finally, mention can be made as radioactive compounds of : $Cs_2UCl_6$, $Cs_2UO_2Cl_4$, $Cs_2NpCl_6$, $Cs_2PuCl_6$.

In fact, the substances to be incorporated into the polymeric film are characterized by their first redox potential which has to be respectively less negative or less positive than the cathodic or anodic reaction potential of the solvent or of the supporting electrolyte contained in the electrolytic bath.

According to the envisaged case, the dopant will react at a potential which is:

a) less cathodic (or anodic) than the reaction potential of the monomer for forming the polymer;

b) equal to the reaction potential of the monomer;

c) more cathodic (or anodic) than the potential of the monomer but still situated before the cathodic (or anodic) reaction of the solvent or the supporting electrolyte.

The process according to the invention is therefore applicable when, in the electrolysis bath, the dopant, which is present as ion, is completely or partially discharged at the electrode onto which it is deposited.

The following examples may be mentioned:

the incorporation of aluminium starting from $AlCl_3$ based on the following electrochemical reaction: $Al^{3+}+3e\longrightarrow Al^O$;

the incorporation of lead or metallic magnesium starting from $PbCl_2$ or $MgCl_2$ ($Pb^{2+}+2e\longrightarrow Pb^O$; $Mg^{2+}+2e\longrightarrow Mg^O$);

the incorporation of metallic titanium starting from $TiBr_4$ or $TiCl_3$ ($Ti^{4+}+4e\longrightarrow Ti^O$; $Ti^{3+}+3e\longrightarrow Ti^O$);

the incorporation of metallic iron starting from $FeCl_2$, $FeBr_3$ or $FeCl_3$ ($Fe^{2+}+2e\longrightarrow Fe^O$; $Fe^{3+}+3e\longrightarrow Fe^O$);

the incorporation of metallic molybdenum starting from $MoCl_3$, $MoBr_3$ or $MoBr_4$ ($Mo^{3+}+3e\longrightarrow Mo^O$; $Mo^{4+}+4e\longrightarrow Mo^O$);

the incorporation of metallic manganese starting from $MnCl_2$ ($Mn^{2+}+2e\longrightarrow Mn^O$).

The process according to the invention is also particularly suited for the preparation of thin $\alpha$ emitting layers based for example on the incorporation of actinide elements.

As examples the following electrochemical reactions can be mentioned:

$U^{3+}+3e\longrightarrow U^O$; $U^{4+}+e\longrightarrow U^{3+}$; $UO_2^{2+}+e\longrightarrow UO_2^+$; $Np^{3+}+3e\longrightarrow Np^O$.

As already indicated hereinabove, it is possible to use the electrically conductive surface to be coated as cathode or as anode, depending on the nature of the electrolysis bath. This surface may for example be metallic or may be composed of graphite or may further be an ITO electrode.

This cathode or anode is polarized to a potential situated in the range corresponding to electron transfer between the considered electrode and the monomer, but respectively less negative or less positive than the reaction of the solvent or of the supporting electrolyte in case the conductive surface to be coated is used as cathode or as anode and respectively more negative or more positive than the first reaction potential of the dopant depending on the fact whether this surface is used as cathode or as anode. The value of the electrolysis potential depends, of course, from the nature of the solvent, monomer and dopant. This value is determined after analysis of the electrochemical curves obtained by voltamperometry. In practice, the potential range compatible with the process according to the invention comprises all of the potentials at which the monomer and the dopant undergo an electron transfer wherein the surface to be coated is implied, but lower in absolute value than the reaction potential of the solvent or of the supporting electrolyte.

In the case wherein the oxidoreduction reaction of the dopant in the electrolytic bath is prior to the one of the monomer, the compatible potential range is delimited by the electron transfer potential of the monomer and by the reaction potential of the solvent.

On the other hand, in the case wherein the oxidoreduction reaction of the dopant follows the one of the monomer, the compatible potential range is delimited by the electron transfer potential of the dopant and by the reaction potential of the solvent.

Figure 5:
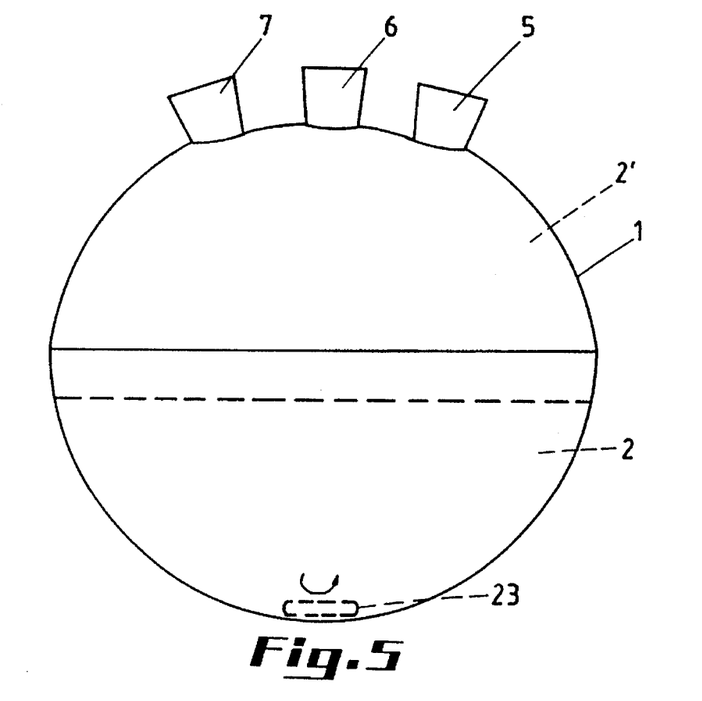
FIG. 5 is a schematic elevational view of an electrochemical cell suited for carrying out the process according to the invention wherein the electrodes have been omitted.
Figure 6:
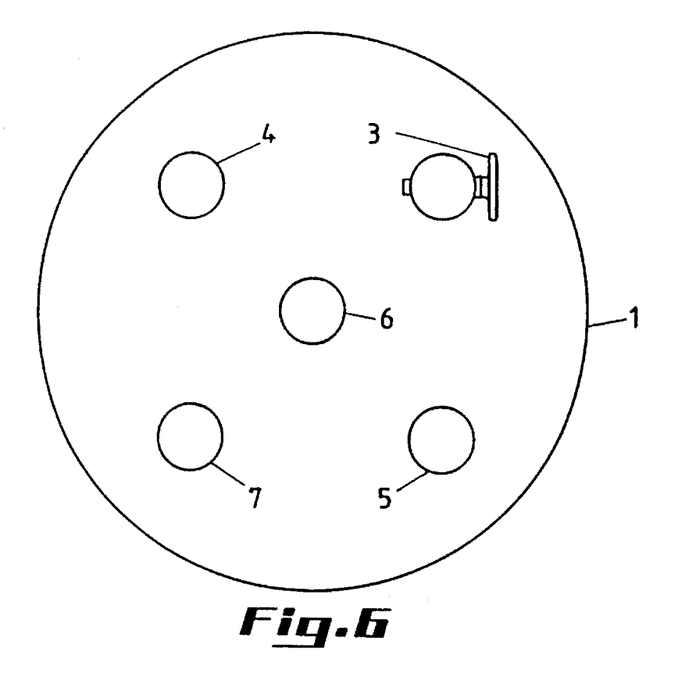
FIG. 6 is a top plan view of the same cell.
Figure 7:
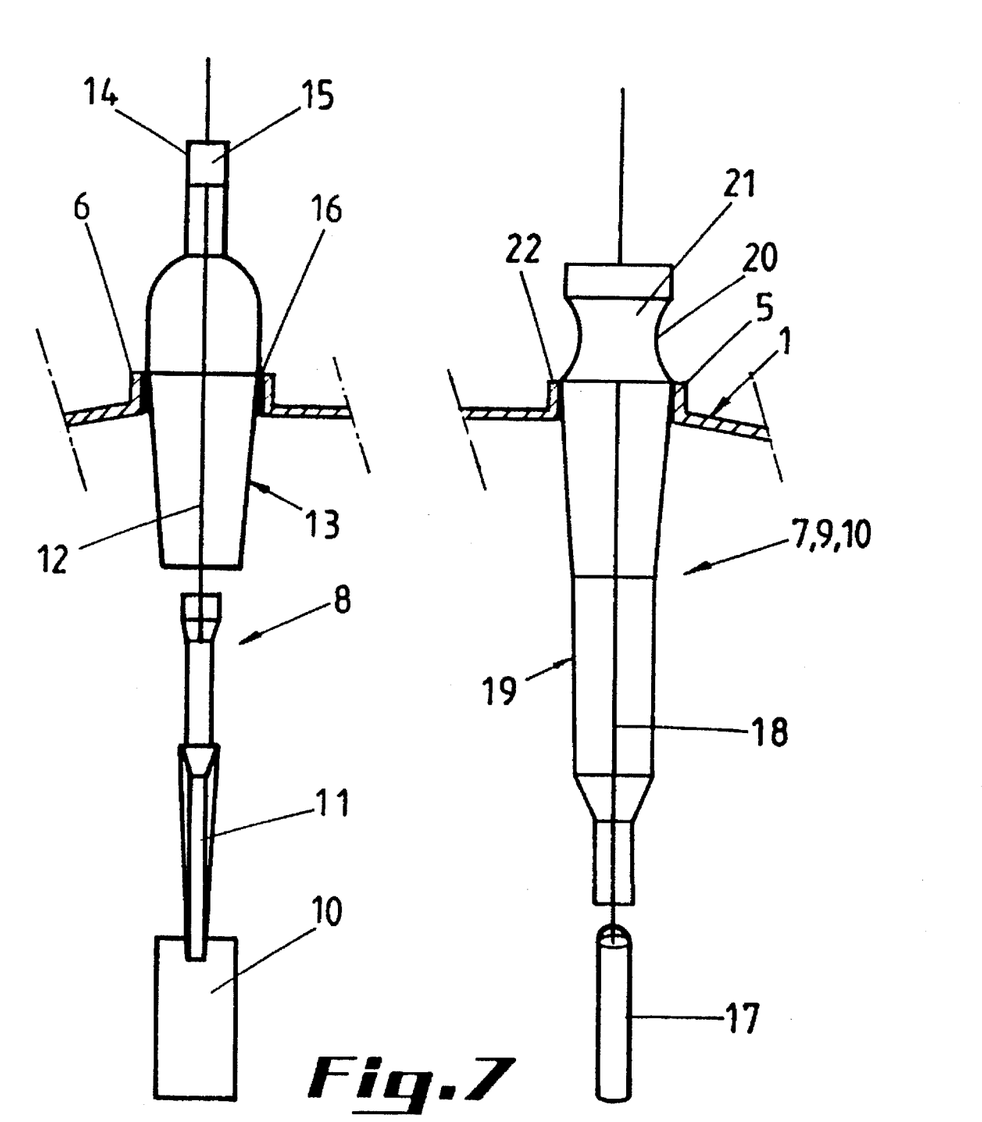
FIG. 7 is a vertical partial copy, on a larger scale, of two of the electrodes mounted in the cell according to FIGS. 5 and 6.

FIGS. 5 to 7 relate to an electrochemical cell known per se and suited for applying the process according to the invention. This cell comprises a closed chamber 1 containing a solution 2 composed of solvent, monomer, supporting electrolyte and dopant. On the bottom of this chamber 1 is provided a magnetic bar 23 revolving around a vertical axis to homogenize the solution 2.

The upper portion of this chamber comprises a cock 3 for maintaining above the solution 2 an inert nitrogen atmosphere 2' and four conical internally ground in holes 4, 5, 6 and 7 wherein electrodes are suspended, in particular a central working electrode 8, two counter electrodes 9 and 10 situated on both sides of the working electrode 8 and a reference electrode 9.

These electrodes have been shown more into detail in FIG. 7. The working electrode 8 comprises on its lower free end a metal sheet 10 to be coated and having for example a width of 1 cm and a height of 2 cm. This sheet 10 is suspended by means of pincers 11 to a conductor 12 extending within a glass sleeve 13, on the axis thereof, the upper opening 14 of which is closed off by an epoxy glue stopper 15. The sleeve 13 has a ground in conical outer wall 16 fitting in a substantially tight way into the hole 6 of chamber 1.

The reference electrode 7 and the counter electrodes 9 and 10 are of the same construction and comprise a platinum sheet rolled up as a cylinder 17 with a surface in the range of 10 cm$^2$. This cylinder 17 is suspended from a conductor 18 extending on the axis of a glass sleeve 19 closed on its upper end 20 by an epoxy glue stopper 21.

Just as for the electrode 8, the electrodes 4, 5 and 7 have a conical outer wall 22 fitting in a tight way in the corresponding holes 4, 5 and 6 of the chamber 1.

In order to further illustrate the subject of the present invention, concrete application examples will be given hereinafter.

EXAMPLE 1

This example relates to the use of a dopant which is characterized by an electron transfer involving the normal state. In the present example, this dopant is formed by $AlCl_3$.

The electrolysis bath was prepared on the basis of the following components:

150 ml of $CH_3CN$ (Janssen, P.A.): dried for 48 hours on calcium hydride ($CaH_2$)

1.9 g of $Et_4NClO_4$ (Fluka, >99%): dried for 24 hours under vacuum (P=10$^{-2}$ mb) at 80°

5 ml of $CH_2=CHCN$ (Aldrich, 99%): dried for 48 hours on $CaH_2$ 20 mg of anhydrous $AlCl_3$ (Alfa Products).

With respect to a platinum pseudo reference immersed into the electrolysis bath, the reduction of aluminium trichloride on a nickel electrode takes place at a potential of −1.1 V, which is less cathodic than the one of the polymerization peak of acrylonitrile (−2.1 V) measured under the same experimental conditions.

The deposition of the composite film was achieved by applying a potential of −2.4 V for 30 seconds.

The characterization of the sample by X-ray fluorescence has demonstrated the presence of aluminium and the absence of chloride ions in the film. Other films have been obtained under other experimental conditions.

| $[AlCl_3]$ (M) | Electrolysis potential (V) | Duration (S) |
|---|---|---|
| 5 × 10$^{-3}$ M | −2.4 V | 30 S |
| 10$^{-2}$ M | −2.5 V | 10 S |

EXAMPLE 2

In this example, the dopant which consists of $FeCl_3$ is characterized by an electron transfer which does not involve the normal state.

The electrolysis bath was prepared on the basis of the following components:

150 ml of $CH_3CN$ (Janssen, P.A.): dried for 48 hours on $CaH_2$ 1.9 g of $Et_4NClO_4$ (Fluka, >99%): dried under vacuum for 24H at 80°

5 ml of $CH_2=CHCN$ (Aldrich, 99%): dried for 48 hours on $CaH_2$ 24 mg of anhydrous $FeCl_3$ (Alfa Products).

With respect to a platinum pseudo reference immersed into the electrolysis bath, the reduction of ferric chloride into iron$''$ takes place about 1 V prior to the polymerization peak of acrylonitrile.

The formation of the composite film has been achieved by applying a potential of −2.25 V for 25 seconds on a Cu electrode.

The characterization of the sample by Xrays (EDAX) has demonstrated the presence of Fe and chloride in the film in a ratio near 0.5.

EXAMPLE 3

In this example, ferrocene was used as dopant and underwent an electron transfer in said potential field such that its chemical structure remains identical.

The electrolysis was performed in a bath formed by the following components:

150 ml of $CH_3CN$ (Janssen, P.A.): dried for 48 hours on $CaH_2$ 4 g of $Et_4NClO_4$ (Fluka, >99%): dried for 24 hours under vacuum at 80°

8 ml of $CH_2=CHCN$ (Aldrich, 99%): dried for 48 hours on $CaH_2$ 0.1 g of ferrocene (Janssen).

Figure 1:
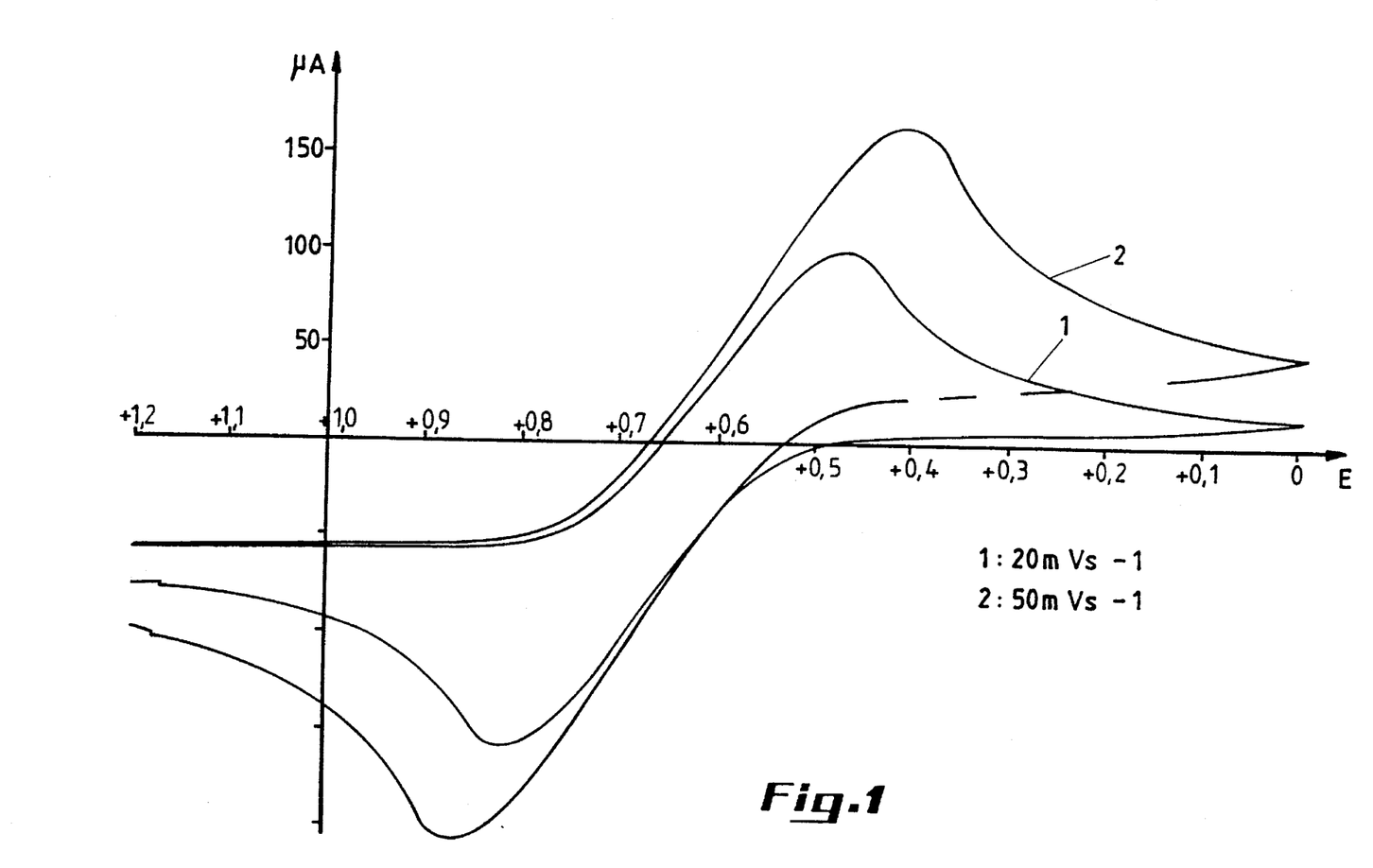
FIG. 1 shows a voltamperogram for a mixture containing ferrocene as dopant, $Et_4NClO_4$ as supporting electrolyte and acetonitrile as solvent.

In an oxydizing medium (presence of perchlorate ions), the $Fe^{II}$ ion of ferrocene is oxidized to $Fe^{III}$. The reduction wave of Fe corresponding of the reaction $Fe^{III}+1e \rightarrow Fe^{II}$ was observed on a voltamperogram recorded at 50 mV/s (FIG. 1) at a potential of +0.4 V on a platinum electrode with respect to a platinum pseudo reference immersed in the electrolysis bath.

The composite film was obtained by applying a potential of −2.35 V on a nickel electrode for 20 seconds. Characterization of the sample by infrared has shown the characteristic signals of cyclopentadienyl rings. The presence of Fe has been certified by EDAX.

EXAMPLE 4

In this example, the dopant was formed by 1,4-benzoquinone and underwent a modification of its chemical structure after the electron transfer.

The electrolysis was performed in a bath formed by the following components:

150 ml of $CH_3CN$ (Janssen, P.A.): dried for 48 hours on $CaH_2$ 2.6 g of $Bu_4NClO_4$ (Alfa Products): dried for 24 hours under vacuum at 80°

10 ml of $CH_2=CHCN$ (Aldrich, 99%): dried for 48 hours on $CaH_2$ 25 mg of 1,4-benzoquinone (Janssen, >99%) purified by sublimation.

Figure 2:
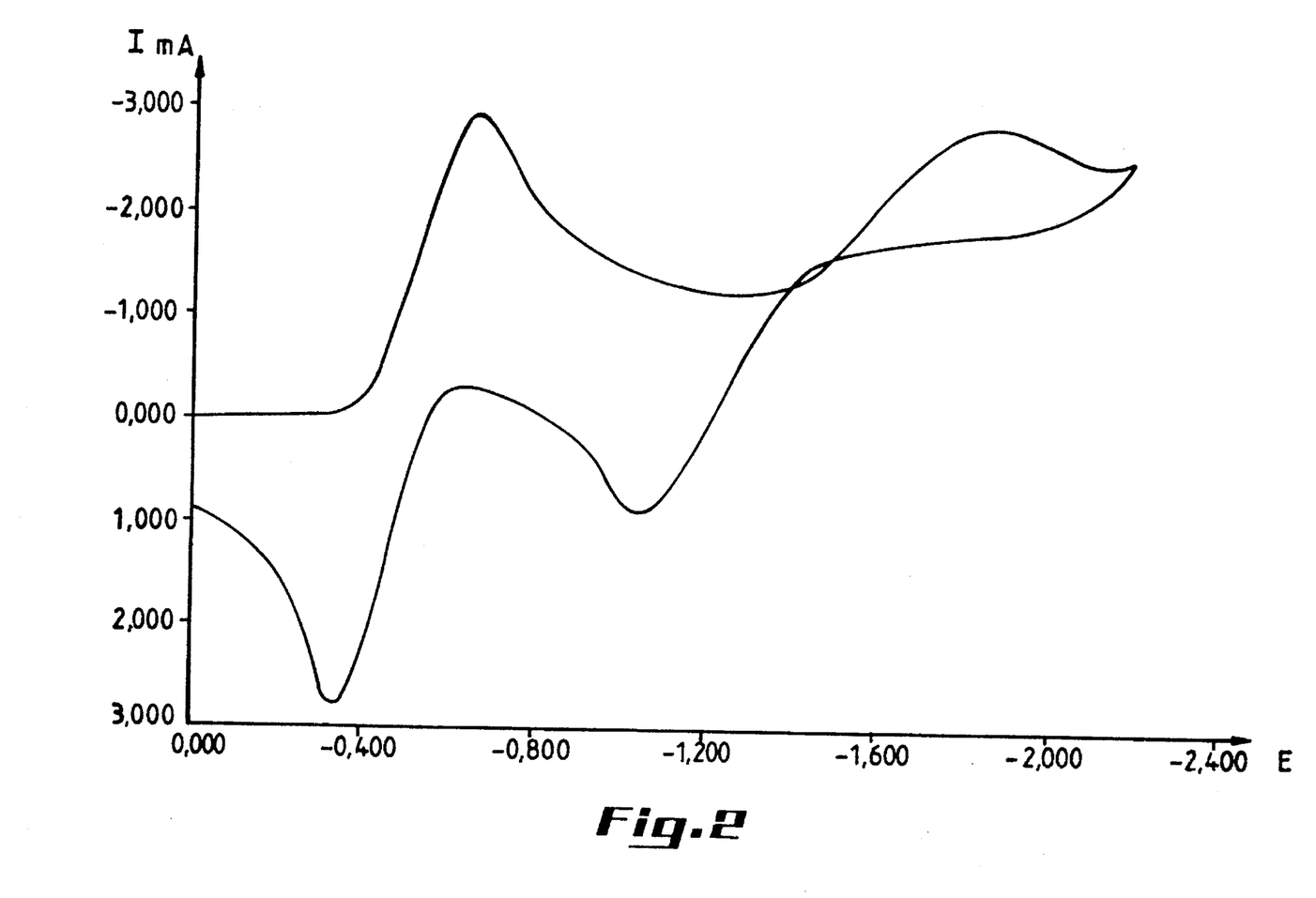
FIG. 2 shows a voltamperogram for a mixture containing benzoquinone as dopant in a solution of $CH_3CN$ and $Et_4NClO_4$.

The reduction of 1,4-benzoquinone in acetonitrile is effected in two steps, more particularly at respective potentials of −0.65 V and −1.8 V with respect to a platinum pseudo reference immersed in the electrolysis bath (FIG. 2).

A homogeneous composite film was deposited by chronoamperometry at a potential of −2.3 V for 20 seconds. The presence of benzene rings has been shown by I.R. (infrared).

EXAMPLE 5

In this example, use is made of a radioactive dopant composed of $Cs_2UCl_6$. This dopant is characterized by an electron transfer involving the normal state.

This particular dopant was synthesized starting from natural uranium turnings. An amount of 5.37 g of uranium metal was taken. This metal was first cleaned with chloroform to remove the organic matter covering it (oil), pickled with 60 ml of $HNO_3$ and rinsed with deionised water. The mass remaining after pickling comprised 4.6654 g i.e. $1.96 \cdot 10^{-2}$ mol. The synthesis principle is as follows:

The uranium has been desintegrated with 70 ml of concentrated HCl; since the reaction was very violent, the HCl had to be admixed slowly. The solution was instantaneously colored red due to the intermediate formation of $UCl_3$. After addition of water, the solution had a volume of 240 ml. This solution was green and contained a black precipitate. After centrifugation, the liquid was removed and then added to a CsCl solution (in stoichiometric amount). A $CsUCl_6$ precipitate was achieved by slowly saturating the solution by means of gaseous hydrochloric acid. The solution was again centrifuged and the green $Cs_2UCl_6$ precipitate was collected. This precipitate was washed with concentrated HCl and then dried with ethyl alcohol and sulphuric ether. Finally, the precipitate was dried under an infrared lamp and was subsequently placed in an exsiccator. In this way, 10.0386 g of $Cs_2UCl_6$ was collected resulting in a practical efficiency of 71.5% by the formula $$Rdt = 100 \frac{m(Cs_2UCl_6)M(U)}{M(Cs_2UCl_6)m(U)}$$

wherein

M(U)=238.029 g/mol $M(Cs_2UCl_6)$=716.557 g/mol $m(Cs_2UCl_6)$=10.0386 g m(U)=4.6654 g.

By taking an UV—visible spectrum of $Cs_2UCl_6$ dissolved in $HClO_4$ and by comparing this with a solution made starting from a pure sample of $Cs_2UCl_6$, the presence of tetravalent dissolved uranium was confirmed.

An X-ray diagram (powder method) of the obtained sample appeared to be completely identical to a reference diagram of pure $Cs_2UCl_6$.

Potentiometric titration of the chloride ions indicated a purity of 99.5%.

Subsequently, an electrolysis was performed in an electrolytic bath comprising the following components:

150 ml of $CH_3CN$ (Janssen, P.A.): dried for 48 hours on $CaH_2$ 2.9 g of $Bu_4NPF_6$ (Fluka, P.A.): dried for 24 hours under vacuum at 80°

5 ml of $CH_2=CHCN$ (Aldrich, 99%): dried for 48 hours on $CaH_2$ 0.54 g of $Cs_2UCl_6$ synthetized as described hereinabove.

Figure 3:
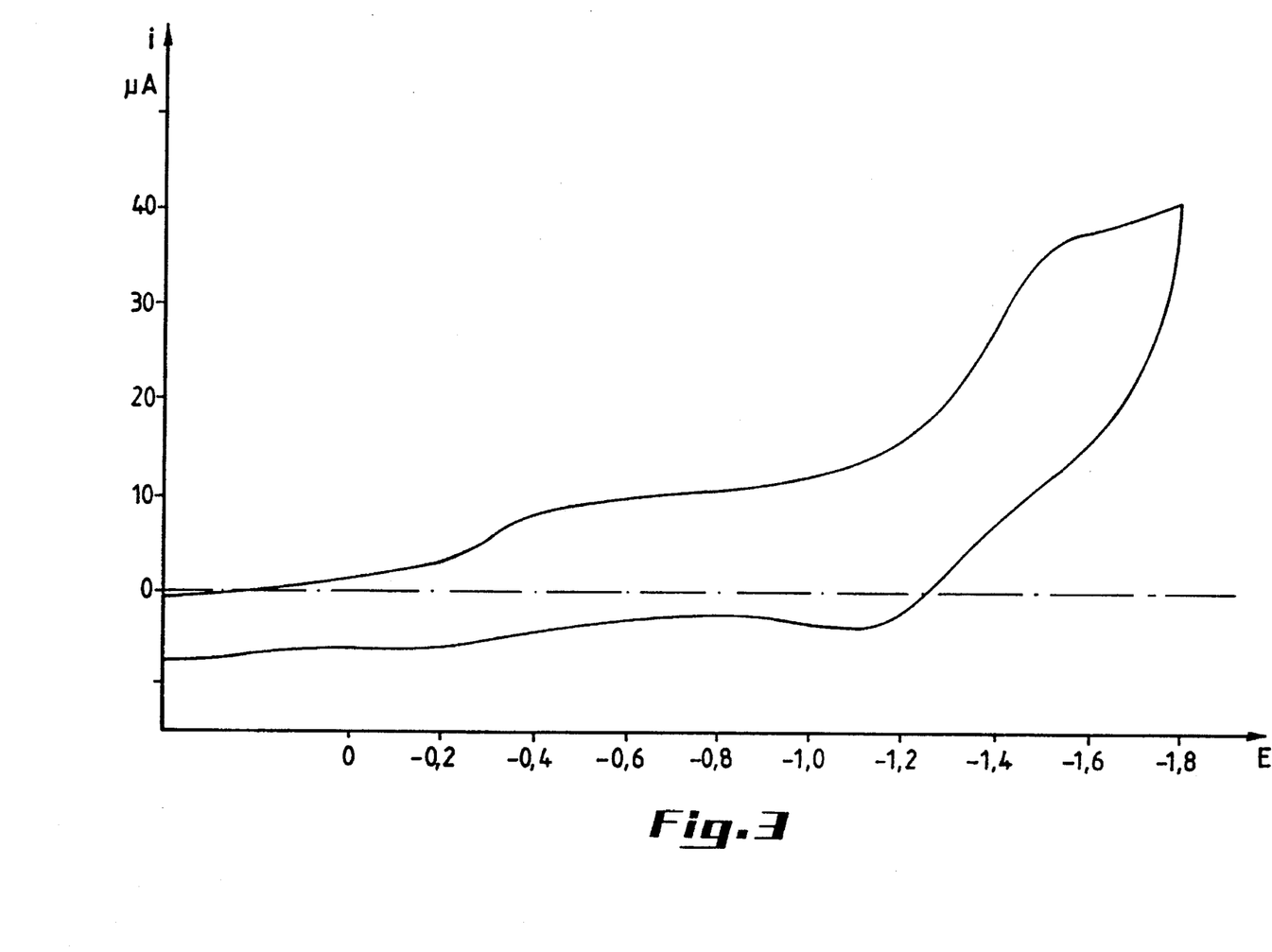
FIG. 3 shows a voltamperogram for a mixture of $Cs_2UCl_6$ in $CH_3CN$ with $Et_4NClO_4$ as supporting electrolyte.

The reduction of $Cs_2UCl_6$ in acetonitrile takes place in two steps, more particularly at the respective potentials of $-0.4$ V ($U^{IV}+1e \rightarrow U^{III}$) and of $-1.5$ V ($U^{III}+3e \rightarrow U^{III}$) with respect to a platinum pseudo reference immersed in a the electrolysis bath (FIG. 3).

A homogeneous film was deposited by applying a potential of −2.25 V for 30 seconds.

The stability in time of the film has been evaluated by repeated α radiation measurements on the same electrode and autoradiographies have shown the formation of a regular and homogeneous composite film on the metallic zinc surface.

EXAMPLE 6

In this example use was also made of a radioactive dopant but this dopant was characterised by a potential which does not involve the normal state. The dopant had the following chemical formula: $Cs_2UO_2Cl_4$.

This dopant was synthetized in the following way: first CsCl was dissolved in a minimum of HCl 1N (about 20% in excess with respect to the stoichiometry) and subsequently $UO_2(NO_3)_2 \cdot 6H_2O$ in HCl 2N, cooled to 0° C. in an ice bath. The two prepared solutions were mixed and the $Cs_2UO_2Cl_4$ precipitated immediately. After filtration, the precipitate was cold washed two times with HCl 12N. The precipitate was then redissolved in a minimum of HCl and was cold reprecipitated with HCl 12N. The product was filtered and washed still under cold conditions with HCl 12N and then with ethanol and sulfuric ether. Finally, it was vacuum dried at 80° C. for 12 hours; and a yellow $Cs_2UO_2Cl_4$ powder was obtained. The achieved efficiency was 42.5% and the Xray diagram of the synthetized product was identical to the one of the reference $Cs_2UO_2Cl_4$.

An electrolysis bath was then prepared on the basis of the following components:

150 ml of $CH_3CN$ (Janssen, P.A.): dried for 48 hours on $CaH_2$ 1.9 g of $Et_4NClO_4$ (Fluka, >99%): dried for 24 hours under vacuum at 80°

5 ml of $CH=CHCN$ (Aldrich, 99%): dried for 48 hours on $CaH_2$ 0.51 g of $Cs_2UO_2Cl_4$ synthetized as indicated hereinabove.

Figure 4:
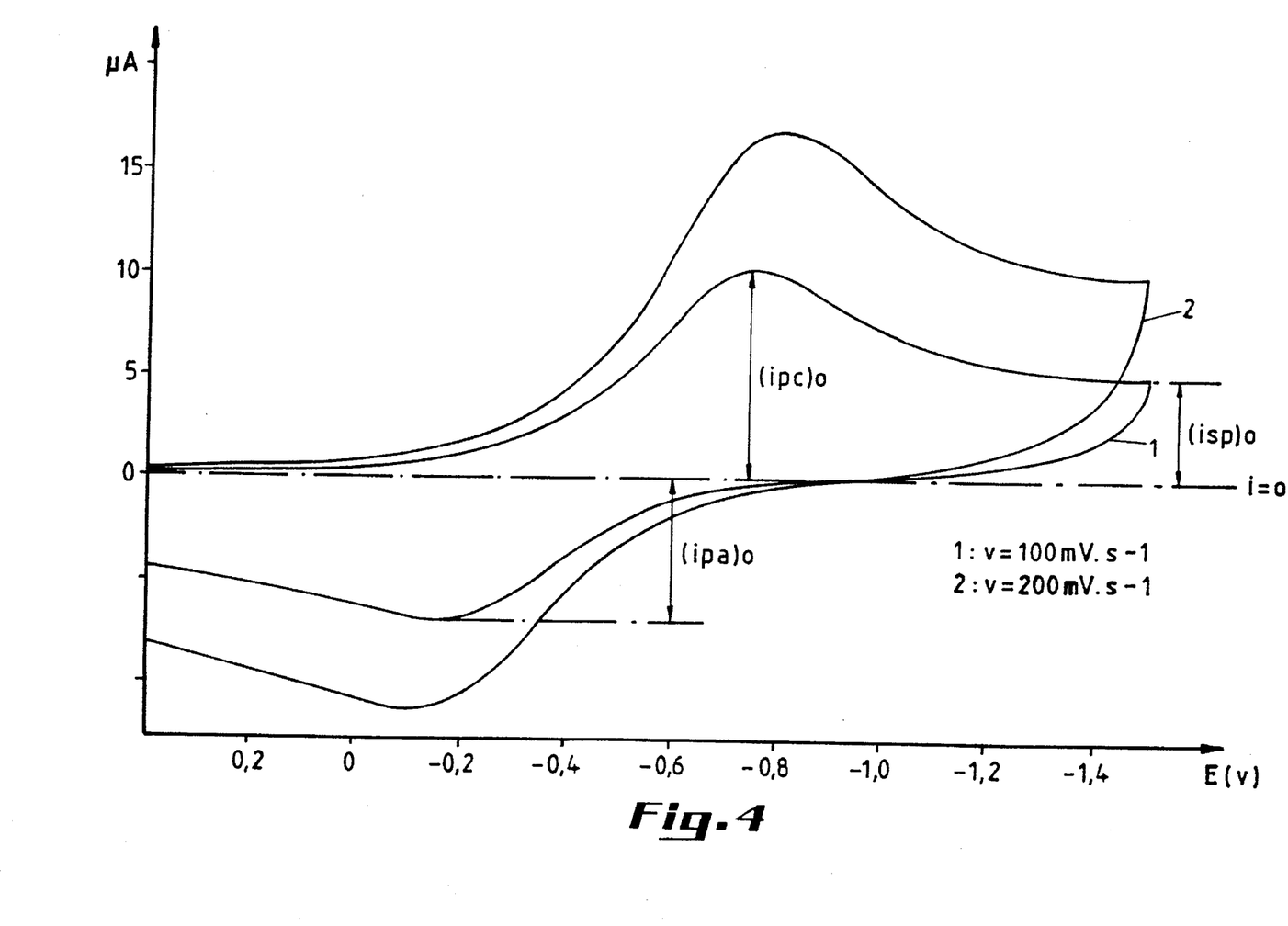
FIG. 4 shows a voltamperogram for a mixture of $Cs_2UO_2Cl_4$ in $CH_3CN$.

The reduction of $Cs_2UO_2Cl_4$ in acetonitrile takes place in one step ($UO_2^{2+}+1e\rightarrow UO_2^+$) at a potential of $-0.8$ V on a Pt electrode with respect to a platinum pseudo reference immersed in the electrolysis bath (FIG. 4).

A homogeneous film was obtained by applying a potential of $-2.2$ V for 15 seconds. The stability of the film was evaluated by $\alpha$ counting after several washing steps with a solvent of the polymer. The autoradiographies have demonstrated a regular and homogeneous coating of the nickel electrodes.

EXAMPLE 7

In this particular example, the solvent is formed by the monomer itself, while the dopant consists of $AlCl_3$.

The electropolymerization was performed in an electrolysis bath comprising the following components:

150 ml of $CH_2=CHCN$ (Aldrich, 99%): dried for 48 hours on $CaH_2$ 1.9 g of $Et_4NClO_4$ (Fluka, >99%): dried for 24 hours under vacuum at 80°

20 mg of anhydrous $AlCl_3$ (Alfa Products).

Under these conditions a homogeneous film, which was however thinner than the same sample prepared in the presence of acetonitrile, was obtained by applying a potential of $-2.5$ V for 10 seconds on a nickel electrode.

Characterization of the sample by X-ray fluorescence has demonstrated the presence of aluminium in the film.

From the above it results that, compared to the known process mentioned in the introductory portion of the description and involving the use of a neutral load, in the process according to the invention a perfectly regular distribution is achieved on the electrode on which the polymerization deposition takes place in contrast to the known process.

In fact, in the process according to the invention, the dopant is incorporated in the polymer on a scale corresponding to the ionic or molecular distribution in the electrochemical double layer since it is assumed that an ion, an atom, for example in the case wherein the ion is completely discharged, or a molecule may be enclosed in the growing polymer. The distribution of the dopant over the conductive surface of the electrode follows thus the repartition of the substances present in the diffusion layer.

On the other hand, with respect to the process wherein the monomer has to be modified chemically, the process according to the invention has the big advantage of being able to use any monomer which only has to meet the conditions required for the electropolymerization in aprotic medium. The variety of monomers which may be used is therefore much larger than in the case of the process wherein the monomer requires a previous chemical modification.

In the process according to the invention, as anyway in most of the known processes, it is generally important for the electrolysis bath to have a water content lower than $10^{-3}$ mol per liter.

Of course, the invention is not limited to the different concrete embodiments described hereinabove of the electropolymerization process according to the invention but it has to be understood that different variants may be considered without leaving the scope of the invention.

In this way, other supporting electrolytes than those explicitly mentioned hereinabove may for example be used in the electrolysis bath of the process according to the invention. This supporting electrolyte may contain for example perchlorates, tosylates, hexafluorophosphates, tetrafluoroborates, etc. . . . .

The same is true for the dopant and the monomer.

What is claimed is:

1. A process of depositing by electropolymerization a film of a composite material onto an electrically conductive surface, according to which process a mixture comprising:

(a) a monomer which is a precursor of a non-conductive polymer, (b) a substance forming a dopant to be incorporated into this polymer, (c) a supporting electrolyte, and (d) an aprotic solvent is subjected to electrolysis wherein said conductive surface to be coated is used as cathode or as anode and wherein said cathode or anode is polarized to a potential in the range of electron transfer between the electrically conductive surface and the monomer but respectively less negative or less positive than the reaction of the aprotic solvent, to where the aprotic solvent is different from said monomer, or of the supporting electrolyte in case said surface is used as cathode or as anode, said process further comprising the step of making, prior to said electrolysis, a solution starting from said mixture;

wherein said dopant is a substance having an electron transfer potential between two valence states in the range of electron transfer between the monomer and the electrode but respectively less negative or less positive than the reaction of the solvent, where the solvent is different from said monomer or the supporting electrolyte in the event said surface is used as cathode or as anode.

2. The process as claimed in claim 1, wherein the monomer acts as solvent and said monomer dissolves said supporting electrolyte.

3. The process as claimed in claim 1, wherein said supporting electrolyte is soluble in said solvent to form a bath having a conductivity of at least $10^4 \Omega^{-1} cm^{-1}$.

4. The process as claimed in claim 1, wherein said supporting electrolyte contains a quaternary ammonium salt which is soluble in the solvent.

5. The process as claimed in claim 4, wherein said quaternary ammonium salt is selected from the group consisting of: $Et_4NClO_4$, $Bu_4NClO_4$, $Bu_4NPF_6$, $Et_4NBF_4$ and $Et_4NOTos$.

6. The process as claimed in claim 1, wherein the electrolyte is kept at a concentration of between $10^{-3}$ and 5M.

7. The process as claimed in claim 1, wherein the monomer is kept at a concentration of between $10^{-2}$M and 10M.

8. The process as claimed in claim 7, wherein said mixture further contains a solvent which is different from said monomer, and said monomer is kept at a concentration of between $5\times10^{-2}$M and 2M.

9. The process as claimed in claim 1 wherein said monomer is selected from the group consisting of vinylic monomers, cyclic monomers, and mixture thereof.

10. The process as claimed in claim 1, wherein said dopant undergoes an electron transfer within said potential range without change of chemical structure.

11. The process as claimed in claim 10, wherein said dopant is ferrocene.

12. The process as claimed in claim 1, wherein said dopant undergoes a modification of its chemical structure after the electron transfer.

13. The process as claimed in claim 12, wherein said dopant is selected from the group consisting of amides and quinones.

14. The process as claimed in claim 1, wherein said dopant is selected from the group consisting of quinone, amides, naphthalene, and phenanthrene.

15. The process as claimed in claim 1, wherein the dopant is used in a concentration lower than the concentration of the monomer.

16. The process as claimed in claim 1, wherein the dopant is kept at a concentration of between $10^{-7}$M and 5M.

17. The process as claimed in claim 16, wherein the dopant is kept at a concentration of between $10^{-6}$ and $10^{-1}$M.

18. The process as claimed in claim 1, wherein said substance forming a dopant is in solution in a form selected from the group consisting of an anion, a cation, a molecule, an organic molecule, an undissociated complex, and mixtures thereof.

19. The process according to claim 1 wherein the dopant in said solution is in the form of an anion, a cation, or a complex which does not dissociate into ions in said solution.

20. The process according to claim 19, wherein the dopant is ferrocene.

21. A process of depositing by electropolymerization a film of a composite material onto an electrically conductive surface, according to which process a mixture comprising:

(a) a monomer which is a precursor of a non-conductive polymer, (b) a substance forming a dopant to be incorporated into this polymer, (c) a supporting electrolyte, and (d) an aprotic solvent is subjected to electrolysis wherein said conductive surface to be coated is used as cathode or as anode and wherein said cathode or anode is polarized to a potential situated in the range of electron transfer between the electrically conductive surface and the monomer by respectively less negative or less positive than the reaction of the aprotic solvent, to where the aprotic solvent is different from said monomer, or of the supporting electrolyte in case said surface is used as cathode or as anode, said process further comprising the step of making, prior to said electrolysis, a solution starting from said mixture;

wherein said dopant is an inorganic compound.

22. The process as claimed in claim 21, wherein said dopant is selected from the group consisting of: $TiCl_4$, $CuBr_2$, $Fe(Ac)_2$, $NiBr_2(P\Phi_3)_2$, $AgNO_3$, $AlCl_3$, $FeCl_3$, $MoCl_3$, $MoCl_5$, $MnBr_2$, $CrCl_3$, $WCl_6$, and $VCl_3$.

23. The process as claimed in claim 21, wherein said dopant, is radioactive.

24. The process as claimed in claim 23, wherein said dopant is selected from the group consisting of $Cs_2UCl_6$, $Cs_2UO_2Cl_4$, $Cs_2NpCl_6$, and $Cs_2PuCl_6$.

* * * * *